United States Patent
Suzuki et al.

(10) Patent No.: US 8,636,615 B2
(45) Date of Patent: Jan. 28, 2014

(54) PLANETARY GEAR TRAIN WITH OILING SYSTEM FOR SUPPLYING LUBRICANT OIL TO BEARING OF PLANETARY GEAR AND WIND TURBINE GENERATOR INCORPORATING THE SAME

(71) Applicants: Mitsubishi Heavy Industries, Ltd., Tokyo (JP); Ishibashi Manufacturing, Co., Ltd., Nogata (JP)

(72) Inventors: Kazutaka Suzuki, Tokyo (JP); Kazufumi Takayanagi, Tokyo (JP); Takafumi Yoshida, Tokyo (JP); Tadasuke Nishioka, Tokyo (JP); Toshiharu Goya, Nogata (JP); Motohisa Uesato, Nagoya (JP); Masahiro Kusaka, Nagoya (JP)

(73) Assignees: Mitsubishi Heavy Industries, Co., Ltd, Tokyo (JP); Ishibashi Manufacturing Co., Ltd., Fukuoka (JP)

( * ) Notice: Subject to any disclaimer, the term of this patent is extended or adjusted under 35 U.S.C. 154(b) by 0 days.

(21) Appl. No.: 13/778,896

(22) Filed: Feb. 27, 2013

(65) Prior Publication Data
US 2013/0172144 A1 Jul. 4, 2013

Related U.S. Application Data (63) Continuation of application No. PCT/JP2010/064829, filed on Aug. 31, 2010.

(51) Int. Cl.
F16H 57/04 (2010.01)
(52) U.S. Cl.
USPC .......................................... 475/159
(58) Field of Classification Search
None
See application file for complete search history.

(56) References Cited

U.S. PATENT DOCUMENTS

| 4,719,818 A * | 1/1988 | McCreary ..................... 475/159 |
| 6,890,280 B2 * | 5/2005 | Oshidari et al. ............... 475/159 |
| 7,214,157 B2 * | 5/2007 | Flamang et al. ............... 475/159 |
| 8,025,601 B2 * | 9/2011 | Iwasaki et al. ................ 475/159 |
| 8,298,108 B2 * | 10/2012 | Nishida et al. ................ 475/159 |
| 8,425,361 B1 * | 4/2013 | Beckner et al. ............... 475/159 |
| 2007/0082778 A1 * | 4/2007 | Yamamura et al. .......... 475/317 |
| 2011/0140448 A1 * | 6/2011 | Takeuchi et al. ................ 290/55 |

FOREIGN PATENT DOCUMENTS

| JP | 58-131453 A | 8/1983 |
| JP | 60169462 U | 11/1985 |

(Continued)

OTHER PUBLICATIONS

Written Opinion of the International Searching Authority in correspond to PCT/JP2010/064829, mailed Sep. 11, 2010.

(Continued)

*Primary Examiner* — Dirk Wright
(74) *Attorney, Agent, or Firm* — Kanesaka Berner & Partners, LLP (57) ABSTRACT

A planetary gear train is provided with: a planetary gear; a planetary pin for supporting the planetary gear; a carrier for supporting the planetary pin; and a housing for accommodating at least a portion of the carrier, the planetary gear and the planetary pin. The planetary gear is rotatable with respect to the planetary pin by a bearing. An oiling flow path for supplying lubricant oil to the bearing is formed inside the carrier. The carrier receives the lubricant oil into the oiling flow path from an oiling member stationarily fixed to the housing. The inlet for receiving the lubricant oil into the oiling flow path of the carrier from the oiling member is positioned inside the housing.

11 Claims, 9 Drawing Sheets

(56) References Cited

FOREIGN PATENT DOCUMENTS

| JP | 07208586 A | 8/1995 |
| JP | 08121578 A | 5/1996 |
| JP | 2007333141 A | 12/2007 |
| JP | 2009144533 A | 7/2009 |
| JP | 2009243570 A | 10/2009 |

OTHER PUBLICATIONS

IPRP in correspond to PCT/JP2010/064829, issued Mar. 12, 2013.

* cited by examiner

PLANETARY GEAR TRAIN WITH OILING SYSTEM FOR SUPPLYING LUBRICANT OIL TO BEARING OF PLANETARY GEAR AND WIND TURBINE GENERATOR INCORPORATING THE SAME

CROSS-REFERENCE TO RELATED APPLICATION

This application is a continuation of International Application No. PCT/JP2010/064829, filed on Aug. 31, 2010.

BACKGROUND OF THE INVENTION

1. Field of the Invention

The present invention generally relates to a planetary gear train, a wind turbine generator and a manufacture method of a carrier of the planetary gear train, and in particular, to an oiling mechanism for oiling a bearing of a planetary gear in a planetary gear train.

2. Description of the Related Art

A planetary gear train is one of mechanisms widely used as step-up gear boxes and reduction gear boxes. A planetary gear train has an advantage that a large reduction ratio can be obtained with a small number of gears and a large torque can be transferred. Such an advantage is preferable for a wind turbine generator and the planetary gear train is widely employed as the step-up gear box of the wind turbine generator.

One of technical matters to be taken into consideration in using a bearing as a bearing of a planetary gear in a planetary gear train is supply of lubricant oil to the bearing. In order to prolong a lifetime of a bearing, it is desirable to perform forcible oiling. Feeding lubricant oil by forcible oiling allows keeping the performance of the oil film, prolonging the lifetime of the bearing. One problem is that the bearing of a planetary gear in a planetary gear train is provided on a rotating body (i.e., a carrier). Forcible oiling to the bearing of a planetary gear in a planetary gear train requires supplying lubricant oil from a stationary body (e.g., a housing) to the bearing provided on the rotating body. Here, an improper design of a lubricant oiling supply system for supplying lubricant oil from the stationary body to the bearing on the rotating body causes leakage of the lubricant oil, which is undesirable in operating a wind turbine generator. Although use of a complicated seal structure may prevent the leakage of lubricant oil, this increases the cost on the contrary. Japanese Patent Application Publication No. P2007-333141A discloses a widely used seal structure between a stationary body and a rotating body, for example. Also, Japanese Patent Application Publication No. P2009-243570A discloses a seal structure adapted to a power transmission device, for example.

SUMMARY OF INVENTION

Therefore, an objective of the present invention is to provide a technique for preventing leakage of lubricant oil from a lubricant oil supply system which supplies lubricant oil to a bearing of a planetary gear with a simple structure.

In an aspect of the present invention, a planetary gear train is provided with: a planetary gear; a planetary pin for supporting the planetary gear; a carrier for supporting the planetary pin; and a housing for accommodating at least a portion of the carrier, the planetary gear and the planetary pin. The planetary gear is rotatable with respect to the planetary pin by a bearing. An oiling flow path for supplying lubricant oil to the bearing is formed inside the carrier. The carrier receives the lubricant oil into the oiling flow path from an oiling member stationarily fixed to the housing. The inlet for receiving the lubricant oil into the oiling flow path of the carrier from the oiling member is positioned inside the housing.

In one embodiment, the carrier may be provided with: a carrier main body to which the planetary pin is fixed; and an extending member formed as a member distinct from the carrier main body and jointed with the carrier main body. In this case, the inlet of the oiling flow path of the carrier is provided for the extending member, and a seal structure to be slid against the extending member is attached to the oiling member, wherein the extending member has a sliding surface to be slid against the seal structure and the inlet of the oiling flow path of the carrier is provided through the sliding surface and the sliding surface is surface-processed to be smooth. Such a configuration is particularly useful in a case that the carrier main body is manufactured by casting.

The seal structure may be provided with first and second sealing members. In this case, it is preferable that the inlet of the oiling flow path of the carrier is positioned between the first and second sealing members and the first and second sealing members configure a flow path for supplying the lubricant oil from the oiling member to the oiling flow path of the carrier.

Either a sliding bearing or a rolling bearing may be used as the bearing for supporting the planetary gear. The use of a sliding bearing is advantageous in terms of a large bearable load.

In another aspect of the present invention, a wind turbine generator is provided with: a wind turbine rotor including a rotor head and a wind turbine blade coupled with the rotor head; a gear box including an input shaft coupled to the rotor head; and a power generator coupled to an output shaft of the gear box. The gear box includes a housing and a planetary gear train. The planetary gear train includes: a planetary gear; a planetary pin for supporting the planetary gear; and a carrier for supporting the planetary pin. The housing accommodates at least a portion of the carrier, the planetary gear and the planetary pin. The planetary gear is rotatable with respect to the planetary pin by a bearing. An oiling flow path for supplying lubricant oil to the bearing is formed inside the carrier. The carrier receives the lubricant oil into the oiling flow path from an oiling member stationarily fixed to the housing. The inlet for receiving the lubricant oil into the oiling flow path of the carrier from the oiling member is positioned inside the housing.

In still another aspect of the present invention, a method of manufacturing a carrier of a planetary gear train includes steps of: manufacturing a carrier main body by casting with a first oiling flow path provided inside thereof and to support a planetary pin; manufacturing an extending member with a second oiling flow path provided inside thereof for receiving lubricant oil from an oiling member provided for a stationary body; performing surface-processing on a sliding surface of the extending member to be smooth, said sliding surface being to be slid against a seal attached to the oiling member; and coupling the carrier main body with the extending member so that the first oiling flow path and the second oiling flow path are connected.

According to the present invention, there is provided a technique for preventing leakage of lubricant oil from a lubricant oil supply system for supplying lubricant oil to a bearing of a planetary gear with a simple structure.

DESCRIPTION OF PREFERRED EMBODIMENTS

Figure 1:
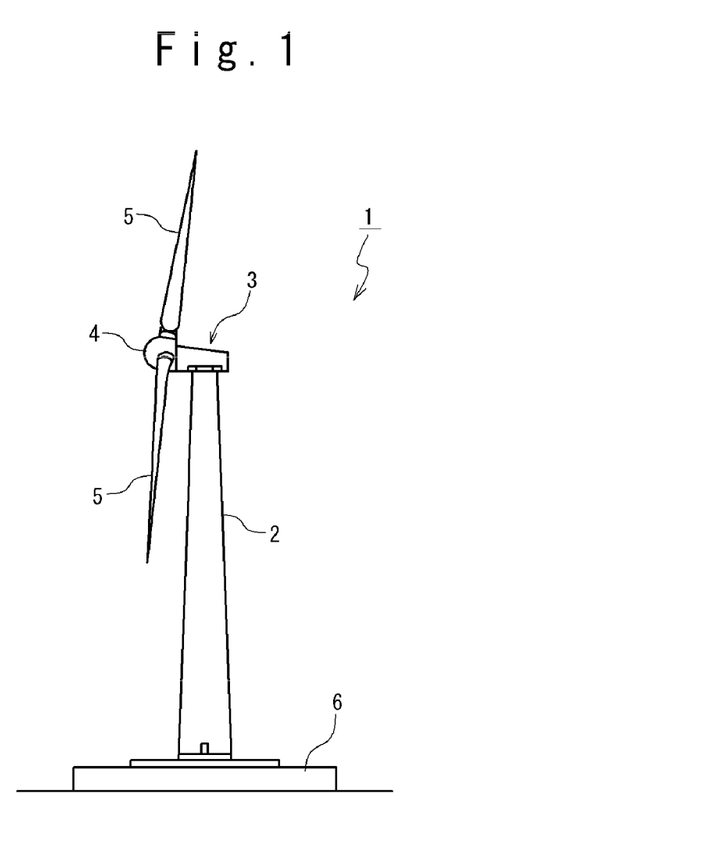
FIG. 1 is an outline view showing the configuration of a wind turbine generator using a planetary gear train of one embodiment of the present invention.

FIG. 1 is an outline view showing the configuration of a wind turbine generator using a planetary gear train of one embodiment of the present invention. The wind turbine generator 1 includes a tower 2 stood on a base 6, a nacelle 3 provided on the top of the tower 2, a rotor head 4 rotatably attached to the nacelle 3, and wind turbine blades 5 attached to the rotor head 4. The rotor head 4 and the wind turbine blades 5A form a wind turbine rotor.

Figure 2:
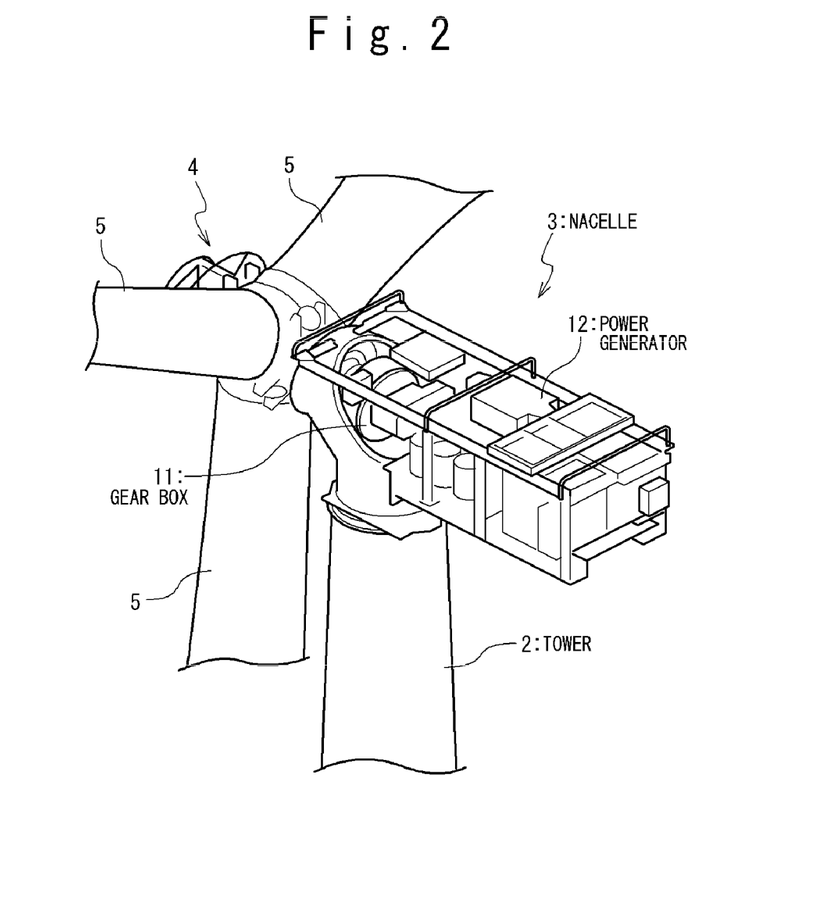
FIG. 2 is a perspective view showing the inner structure of a nacelle in one embodiment of the present invention.

As shown in FIG. 2, a gear box 11 and a power generator 12 are provided inside the nacelle 3. The input shaft of the gear box 11 is jointed with the main shaft (not shown) of the rotor head 4, and the output shaft of the gear box 11 is jointed with the rotor of the power generator 12. When the rotor head 4 is rotated by wind power, the rotation thereof is stepped up by the gear box 11 and transferred to the rotor of the power generator 12 so that the power generator 12 is driven. As a result, electric power is obtained from the power generator 12.

Figure 3:
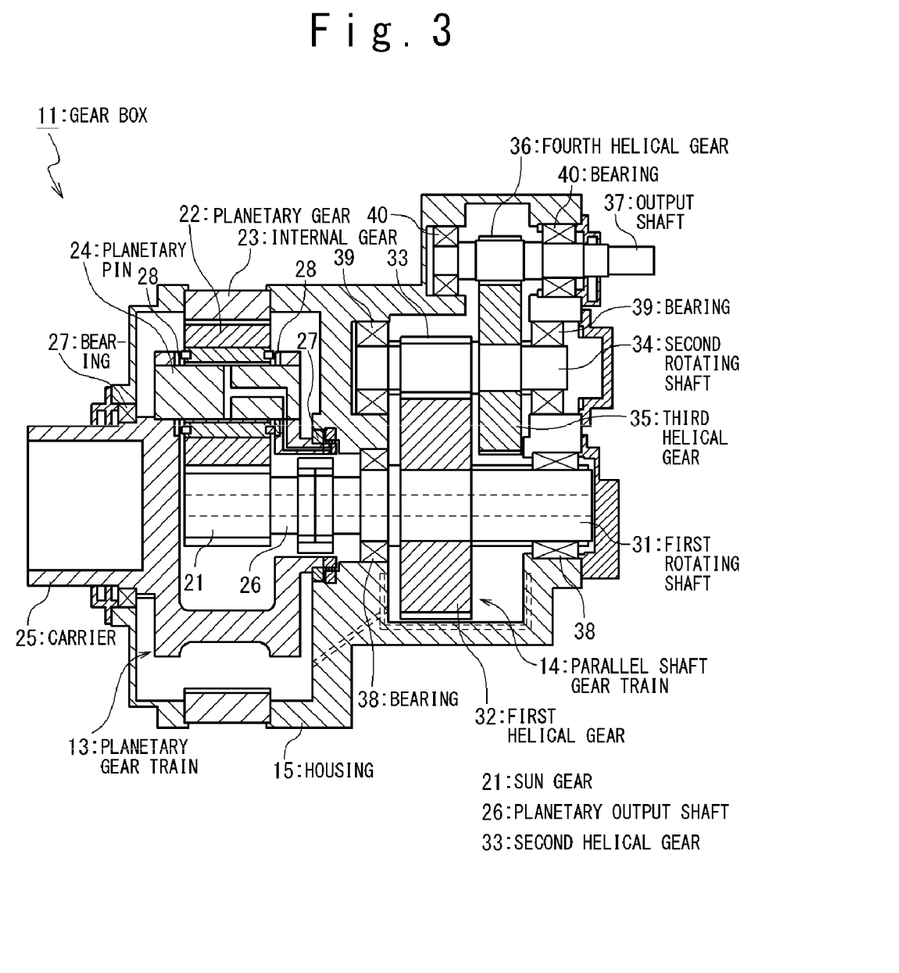
FIG. 3 is a sectional view showing the structure of a gear box in one embodiment of the present invention.

FIG. 3 is a sectional view showing the configuration of the gear box 11 in this embodiment. The gear box 11 includes a planetary gear train 13, a parallel-shaft gear train 14 and a housing 15 for accommodating them. The planetary gear train 13 includes a sun gear 21, a plurality of planetary gears (only one shown), an internal gear 23, a plurality of planetary pins 24 (only one shown), a carrier 25 and a planetary output shaft 26. The planetary gear 22 is positioned between the sun gear 21 and the internal gear 23 and is supported by the carrier 25 by the planetary pin 24 inserted to the planetary gear 22. Thrust collars 28 are attached to the surface of the carrier 25 opposed to each planetary gear 22 so as to surround each planetary pin 24; each planetary pin 24 penetrates the thrust collars 28. In this embodiment, two thrust collars 28 are attached so as to sandwich each planetary gear 22. The carrier 25 is rotatably supported by bearings 27 provided in the housing 15 and is used as the input shaft of the planetary gear train 13, i.e., as the input shaft of the gear box 11. On the other hand, the planetary output shaft 26 is coupled with the sun gear 21 and is used as the output shaft of the planetary gear train 13. When the carrier 25 is rotated, the rotation thereof is transferred to the sun gear 21 via the planetary gears 22 so that the planetary output shaft 26 connected to the sun gear 21 is rotated at an increased rotation speed.

The parallel-shaft gear train 14 includes a first rotating shaft 31 jointed with the planetary output shaft 26, a first helical gear 32 jointed with the first rotating shaft 31, a second helical gear 33, a second rotating shaft 34 jointed with the second helical gear 33, a third helical gear 35 jointed with the second rotating shaft 34, a fourth helical gear 36, and an output shaft 37 jointed with the fourth helical gear 35. The first rotating shaft 31, the second rotating shaft 34 and the output shaft 37 are rotatably supported by bearings 38, 39 and 40 provided in the housing 15, respectively. Moreover, the first helical gear 32 and the second helical gear 33 are engaged with each other, and the third helical gear 35 and the fourth helical gear 36 are engaged with each other. In the parallel-shaft gear train 14 thus structured, when the planetary output shaft 26 is rotated, the rotation thereof is transferred to the first helical gear 32, the second helical gear 33, the third helical gear 35 and the fourth helical gear 36, and then the output shaft 37 connected with the fourth helical gear 36 is rotated at an increased rotation speed. That is, as the whole of the gear box 11, when the carrier 25 is rotated, the rotation thereof is stepped up by the planetary gear train 13 and the parallel-shaft gear train 14 and the resultant rotation is outputted from the output shaft 37.

In the planetary gear train 13 of this embodiment, a sliding bearing is used as a bearing for rotatably supporting each planetary gear 22. This aims at attaining a long lifetime and reduced size of the bearing of the planetary gear 22. In general, when a planetary gear train is used as a gear box of a wind turbine generator, a large load is applied to the bearings of the planetary gears. Rolling bearings are currently used as the bearings of planetary gears in a planetary gear train in many cases; however, this leads to reduction in the lifetime thereof when a large load is applied to the rolling bearings. Particularly, in high-power wind turbine generators recently developed, increase of the load is a serious problem. In order to address such problem, the inventors have been studying the possibility of using a sliding bearing as a planetary bearing. Since a sliding bearing receives a load by a liquid oil film pressure, it can withstand a large load. With adaptation of a sliding bearing capable of withstanding a large load, there may be a possibility of realizing a planetary gear train free from maintenance. The following describes in detail a structure for attaching the sliding bearing to the planetary gear 22 and a structure for supplying lubricant oil to the sliding bearing.

Figure 4:
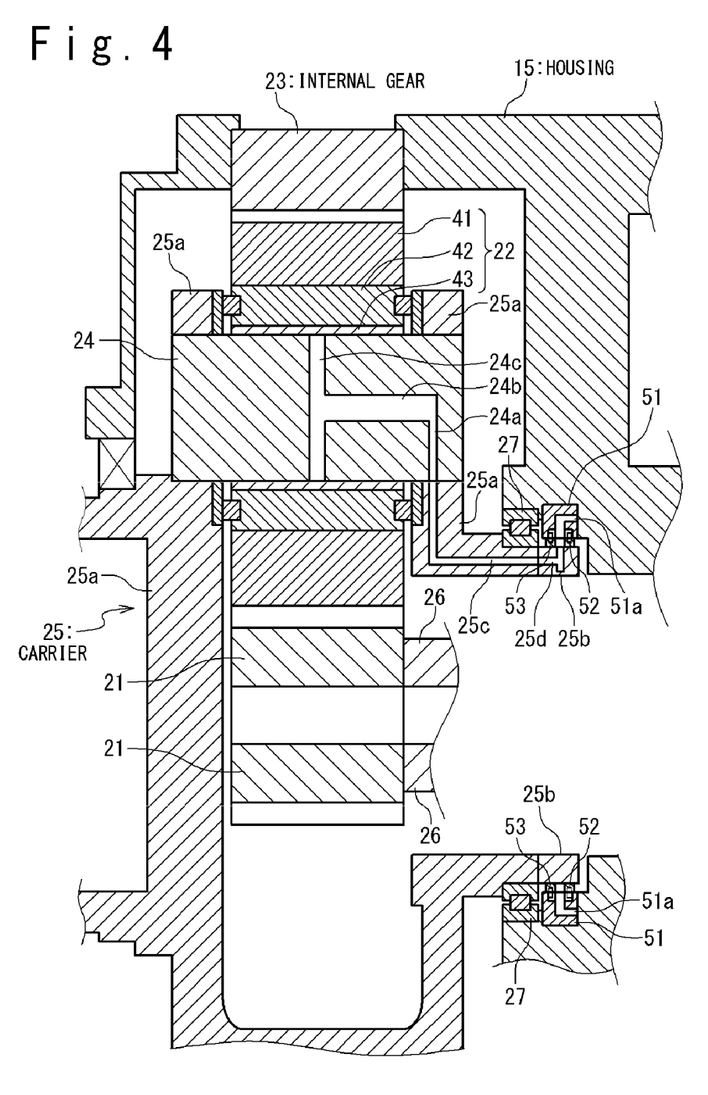
FIG. 4 is an enlarged sectional view showing the structures of a carrier and a planetary pin of the gear box shown in FIG. 3.
Figure 5:
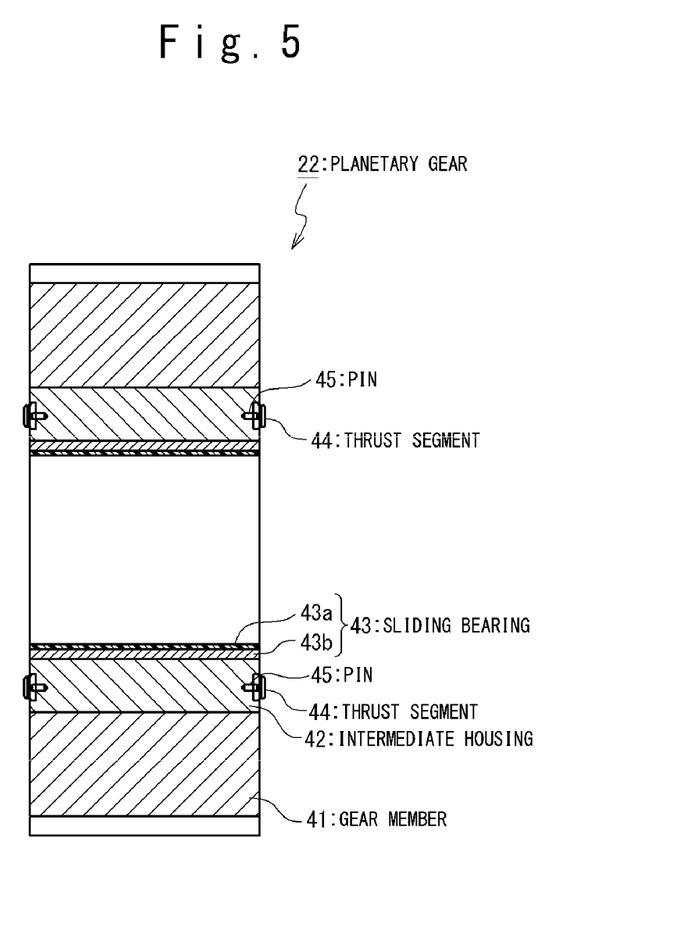
FIG. 5 is a sectional view showing the structure of a planetary gear of the gear box shown in FIG. 3.

FIG. 4 is an enlarged sectional view showing the configurations of a planetary gear 22, a planetary pin 24 and the carrier 25, and FIG. 5 is a sectional view of the configuration of the planetary gear 22. As shown in FIG. 5, the planetary gear 22 schematically includes a gear member 41 having teeth formed on the outer face thereof, an intermediate housing 42 which is a member distinct from the gear member 41, and a sliding bearing 43. In this embodiment, the sliding bearing 43 includes a surface layer 43a including a resin (e.g., PEEK material) and a back metal 43b. The back metal 43b of the sliding bearing 43 is welded to the inner face of the intermediate housing 42, and the intermediate housing 42 is fitted to the gear member 41 by shrink fit. It should be noted here that the structure of the sliding bearing 43 is not limited to this structure. Thrust segments 44 opposed to the thrust collars 28 are attached to the intermediate housing 42. Pins 45 are embedded in both of the intermediate housing 42 and the thrust segments 44 so that the thrust segments 44 are positioned at desired positions on the intermediate housing 42.

In this embodiment, lubricant oil is supplied between the sliding bearing 43 and the planetary pin 24, and a lubricant oil film is thereby formed between the sliding bearing 43 and the planetary pin 24. This lubricant oil film is formed to support a large load by elastic fluid lubrication. In this embodiment, in order to form the lubricant oil film, the lubricant oil is supplied between the inner surface of the sliding bearing 43 and the outer surface of the planetary pin 24 through oiling paths provided inside the planetary pin 24 and the carrier 25. In the following, a detailed description is given of an oiling mechanism for supplying lubricant oil between the sliding bearing 43 and the planetary pin 24 referring to FIG. 4.

In this embodiment, the carrier 25 includes: a carrier main body 25a supporting a plurality of planetary pins 24; and an extending member 25b secured to the carrier main body 25a. The bearings 27 are attached onto the carrier main body 25a so as to rotatably support the carrier 25, and the extending member 25b has an annular shape and is secured so as to extend in parallel to the shaft direction of the planetary output shaft 26 from a portion of the carrier main body 25a, to which the bearings 27 are attached. It should be noted here that the carrier main body 25a and the extending member 25b are constructed as distinct members. That is, the carrier 25 is formed by jointing the carrier main body 25a and the extending member 25b which are separately manufactured.

Oiling flow paths 25c and 25d are respectively provided inside the carrier main body 25a and the extending member 25b of the carrier 25, and oiling flow paths 24a, 24b and 24c are provided inside the planetary pin 24. The oiling flow path 25d of the extending member 25b is communicated to the oiling flow path 25c of the carrier main body 25a from the outer surface of the extending member 25b. The numbers of the oiling flow paths 25d of the extending member 25b and the oiling flow paths 25c of the carrier main body 25a are same as the number of the planetary pins 24. For example, when the number of the planetary pins 24 is three, three oiling flow paths 25c and three oiling flow paths 25d are provided in the carrier main body 25a and the extending member 25b, respectively. Each oiling flow path 25c of the carrier main body 25a is communicated with the oiling flow path 24a of the corresponding planetary pin 24. The oiling flow path 24a of the planetary pin 24 extends in the radial direction of the planetary pin 24 from the surface jointed with the carrier main body 25a and reaches the oiling flow path 24b. The oiling flow path 24b is provided along the center axis of the planetary pin 24. The oiling flow path 24c extends in the radial direction of the planetary pin 24 from the oiling flow path 24b and reaches the side surface (i.e., the surface opposed to the sliding bearing 43) of the planetary pin 24.

An annular oiling ring 51 is attached to the housing 15 in the vicinity of the bearing 27. The oiling ring 51 is positioned in such a position that surrounds the extending member 25b of the carrier 25. An annular lubricant oil flow path 51a is formed through the oiling ring 51. The lubricant oil flow path 51a reaches the inner peripheral surface of the oiling ring 51. Two annular floating seals 52 and 53, which are arranged in the axial direction of the first rotating shaft 31 so as to sandwich the lubricant oil flow path 51a, are attached to the oiling ring 51. The floating seals 52 and 53 are contacted with the outer face of the extending member 25b of the carrier 25, and when the carrier 25 is rotated, the floating seals 52 and 53 are slid against the extending member 25b. The outer face of the extending member 25b is smoothed so that the floating seals 52 and 53 are smoothly slid. The oiling flow path 25d of the extending member 25b reaches the outer face of the extending member 25b at a position between the floating seals 52 and 53.

The lubricant oil flow path 51a of the oiling ring 51 is connected to a lubricant oil pump (not shown) provided outside the gear box 11. When lubricant oil is supplied from the lubricant oil pump to the lubricant oil flow path 51a, the lubricant oil is supplied to the oiling flow path 25d provided in the extending member 25b of the carrier 25 via a space between the floating seals 52 and 53, and is further supplied to the outer face of the planetary pin 24 via the oiling flow path 25c inside the carrier main body 25a and via the oiling flow paths 24a, 24b and 24c inside the planetary pin 24. As a result, the lubricant oil film is formed between the sliding bearing 43 and the planetary pin 24.

Figure 6A:
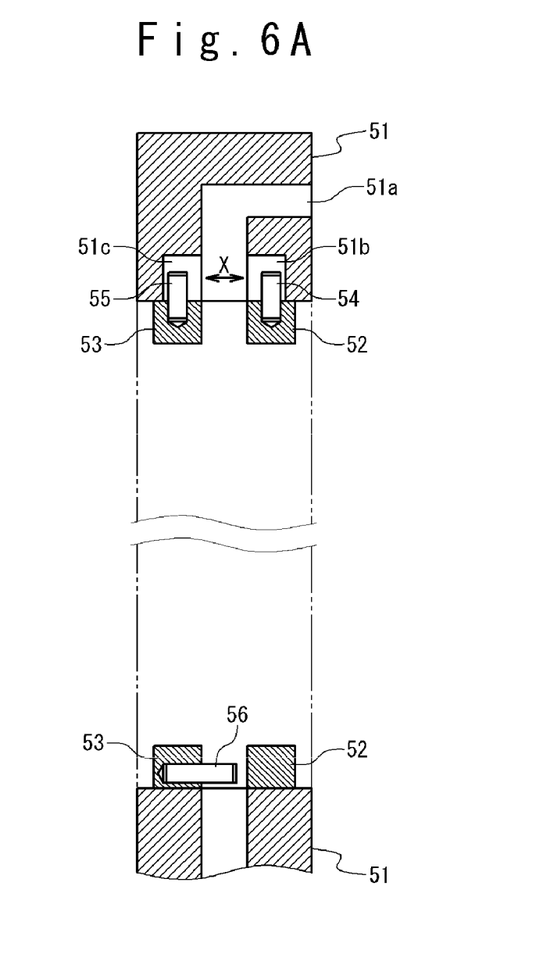
FIG. 6A is a sectional view showing the connecting structure between an oiling ring and a floating seal of the gear box shown in FIG. 3.
Figure 6B:
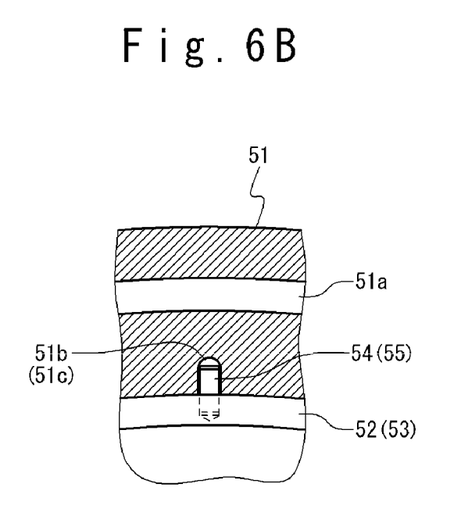
FIG. 6B is a diagram showing the structure of the oiling ring and the floating seal viewed from the position X shown in FIG. 6A.

FIGS. 6A and 6B show the structure for attaching the floating seals 52 and 53 to the oiling ring 51, wherein FIG. 6A is a sectional view of the oiling ring 51 and the floating seals 52 and 53, and FIG. 6B is a diagram showing the oiling ring 51 and the floating seals 52 and 53 seen from the position X shown in FIG. 6A. A notch 51b is formed in a position of the oiling ring 51 that is in contact with the floating seal 52, and a notch 51c is formed in a position of the oiling ring 51 that is in contact with the floating seal 53. A pin 54 is inserted to the notch 51b and a hole formed in the floating seal 52, whereby the floating seal 52 is fixed to the oiling ring 51. Similarly, a pin 55 is inserted to the notch 51c and a hole formed in the floating seal 53, whereby the floating seal 53 is fixed to the oiling ring 51. It should be noted that, although only one pin 54 and one pin 55 are shown in FIG. 6A, a plurality of pins 54 and a plurality of pins 55 may be provided. In this case, the plurality of pins 54 and 55 are arranged with appropriate spaces in the circumferential direction, respectively.

One end of a pin 56 is inserted to the floating seal 53. The pin 56 is provided to protrude from the floating seal 53 toward the floating seal 52. The pin 56 has a function of keeping the floating seals 52 and 53 with an appropriate spacing. It should be noted that, although only one pin 56 is shown in FIG. 6A, a plurality of pins 56 may be provided. In this case, the plurality of pins 56 are arranged with appropriate spaces in the circumferential direction.

It should be noted that, in the planetary gear train 13 of this embodiment, a position where the carrier 25 receives a supply of the lubricant oil from a stationary body (i.e., the oiling ring 51), that is, the inlet of the oiling flow path 25d of the extending member 25b is positioned inside the housing 15 which accommodates the planetary gear train 13. With this structure, the planetary gear train 13 of this embodiment effectively addresses the problem of leakage of the lubricant oil from the lubricant oil supply system which supplies the lubricant oil between the planetary pin 24 and the sliding bearing 43. For example, in a structure that the opening of an oiling flow path provided inside the carrier 25 is positioned outside the housing 15, there arises a necessity of adopting a structure having a high sealing ability at a position where the lubricant oil is supplied from the stationary body to the rotating body and, therefore, there arises a necessity of adopting a complicated seal structure. Whereas, in this embodiment, such a problem does not arise, since the supply position where the carrier 25 receives the supply of the lubricant oil is positioned inside the housing 15. Even when the lubricant oil is leaked a little from the floating seals 52 and 53 provided between the oiling ring 51 and the extending member 25b, the leaked oil is merely discharged inside the housing 15 and is retrieved by a lubricant oil circulation system provided inside the housing 15. Since the floating seals 52 and 53 basically function merely as guides for guiding the lubricant oil from the oiling ring 51 to the extending member 25b, a high sealing ability is not demanded. Hence, a simple structure can be adopted as the floating seals 52 and 53. As thus discussed, according to this embodiment, the problem of the leakage of the lubricant oil can be solved by a simple structure.

Further, it should be noted that the carrier 25 is composed of two members separately manufactured, i.e., the carrier main body 25a and the extending member 25b, in this embodiment. Such structure is preferable in terms of easy manufacture and processing of the carrier 25. The carrier 25 is preferably manufactured by casting, since the carrier 25 inevitably has a complicated structure. When the carrier 25 is manufactured by casting, on the other hand, this causes a rough surface, necessitating smoothing the sliding surfaces of the floating seals 52 and 53 by surface processing. Particularly, when the wind turbine generator 1 is large-sized, the carrier 25 is also large-sized, and therefore the surface processing of the large-sized carrier 25 increases the work-load and the cost. The structure of the carrier 25 of this embodiment allows adopting a manufacture method in which the carrier main body 25a is manufactured by casting and the extending member 25b having a surface-processed outer face is attached to the carrier main body 25a. This facilitates the manufacture and processing of the carrier 25.

In one embodiment, the carrier 25 is manufactured in the following procedure: Initially, the carrier main body 25a and the extending member 25b are separately manufactured by casting. Subsequently, the sliding surfaces of the extending member 25b to be slid against the floating seals 52 and 53 are surface-processed to be smoothed. Subsequently, the carrier main body 25a and the extending member 25b are jointed so that the oiling flow path 25c of the carrier main body 25a and the oiling flow path 25d of the extending member 25b are connected. Such manufacture method facilitates the manufacture and processing of the carrier 25.

Figure 7:
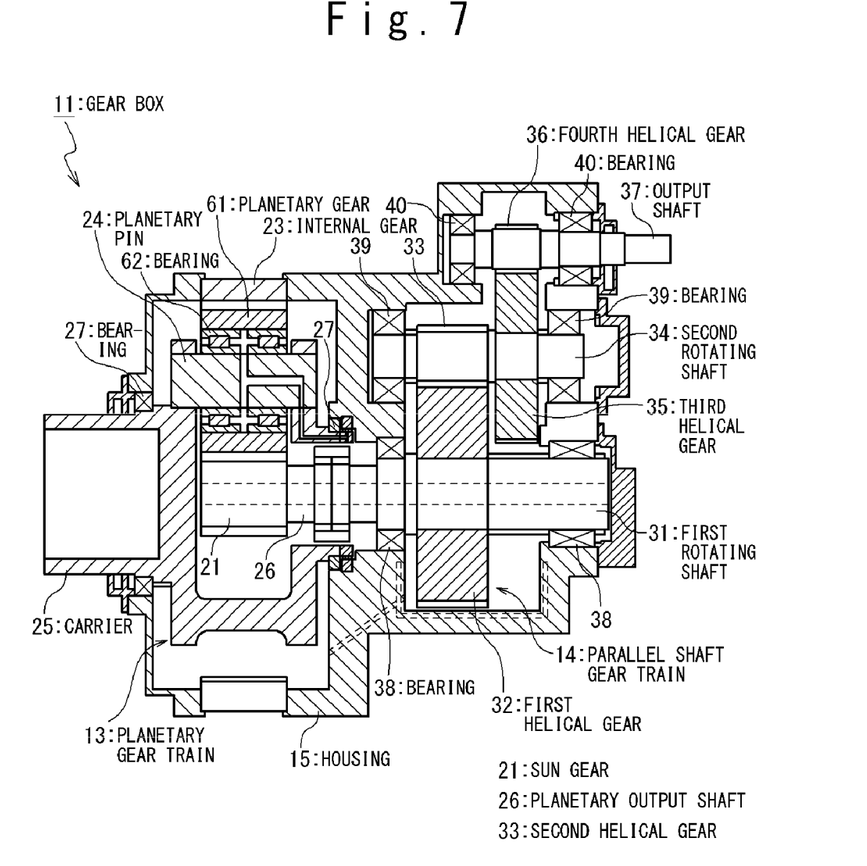
FIG. 7 is a sectional view showing the structure of a gear box in another embodiment of the present invention.
Figure 8:
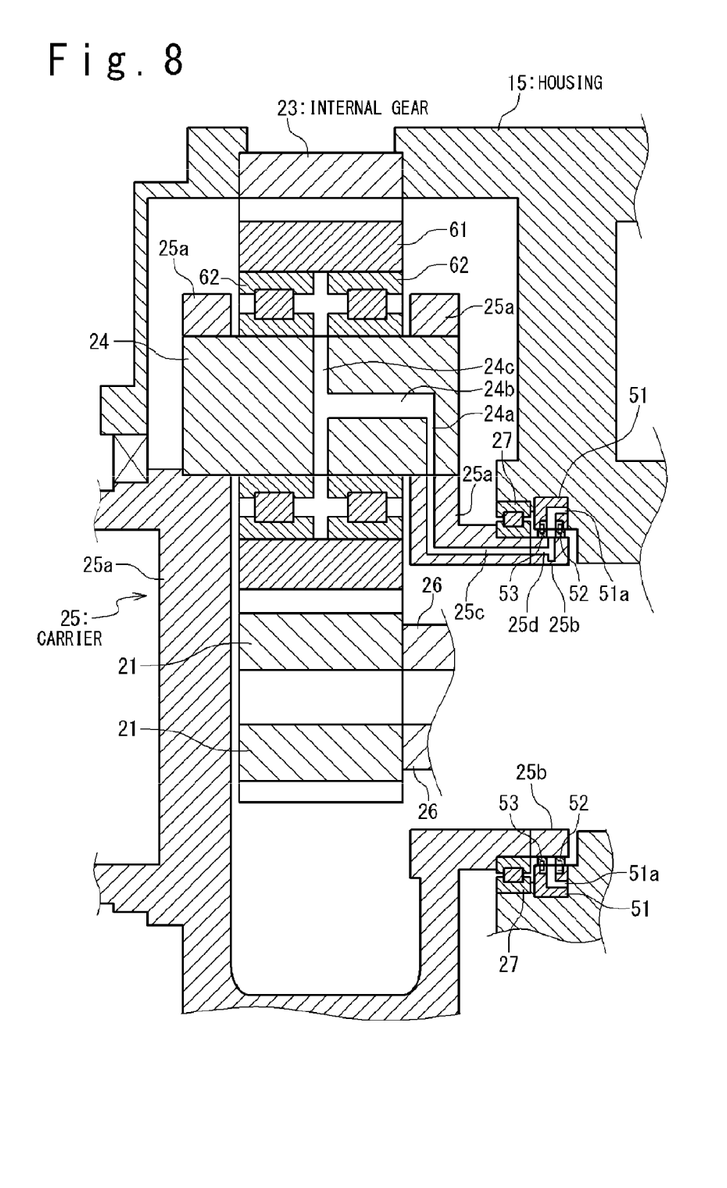
FIG. 8 is an enlarged sectional view showing the structure of a carrier and a planetary pin of the gear box shown in FIG. 7.

FIGS. 7 and 8 are diagrams showing the structure of a gear box 11 in another embodiment of the present invention. In the gear box 11 shown in FIG. 7, a rolling bearing 62 is used as a bearing for supporting a planetary gear 61 of the planetary gear train 13 to be rotatable with respect to a planetary pin 24. As shown in FIG. 8, lubricant oil is supplied to the rolling bearing 62 via oiling flow paths 25c and 25d provided in the carrier 25 and via oiling flow paths 24a to 24c provided in the planetary pin 24, whereby the oil is forcibly supplied to the rolling bearing 62. This embodiment, in which the rolling bearing 62 is used, also solves the problem of the leakage of the lubricant oil from the lubricant oil supply system for supplying the lubricant oil between the planetary pin 24 and the sliding bearing 43, since the position where the carrier 25 receives the supply of the lubricant oil from the stationary body is positioned inside the housing 15 that accommodates the planetary gear train 13.

Although the embodiments of the present invention are specifically described above, the present invention should not be interpreted as being limited to the above embodiments; the present invention may be implemented within the scope thereof with various modifications which are apparent to the person skilled in the art.

What is claimed is:

1. A planetary gear train, comprising:
a planetary gear;
a planetary pin for supporting said planetary gear;
a carrier for supporting said planetary pin; and
a housing for accommodating at least a portion of said carrier, said planetary gear and said planetary pin,
wherein said planetary gear is rotatable with respect to the planetary pin by a bearing;
wherein an oiling flow path for supplying lubricant oil to said bearing is formed inside the carrier;
wherein said carrier is configured to receive said lubricant oil into said oiling flow path from an oiling member stationarily fixed to said housing,
wherein an inlet for receiving the lubricant oil into the oiling flow path of the carrier from the oiling member is positioned inside the housing,
wherein said carrier includes:
a carrier main body to which said planetary pin is fixed; and
an extending member formed as a member distinct from said carrier main body and jointed with said carrier main body,
wherein said inlet of the oiling flow path of the carrier is provided for said extending member,
wherein a seal structure to be slid against said extending member is attached to said oiling member,
wherein said extending member has a sliding surface configured to be slid against said seal structure,
wherein said inlet of said oiling flow path of said carrier is provided through said sliding surface, and
wherein said sliding surface is surface-processed to be smooth.

2. The planetary gear train according to claim 1, wherein said carrier main body is casted.

3. The planetary gear train according to claim 1,
wherein said seal structure includes first and second sealing members, and
wherein said inlet of said oiling flow path of said carrier is positioned between said first and second sealing members and said first and second sealing members form a flow path for supplying said lubricant oil from said oiling member to said oiling flow path of said carrier.

4. The planetary gear train according to claim 2, wherein said seal structure includes first and second sealing members, and
wherein said inlet of said oiling flow path of said carrier is positioned between said first and second sealing members and said first and second sealing members form a flow path for supplying said lubricant oil from said oiling member to said oiling flow path of said carrier.

5. The planetary gear train according to claim 1,
wherein said bearing is a sliding bearing, and
wherein said oiling flow path provided inside said carrier is structured to supply said lubricant oil to a surface of said sliding bearing.

6. The planetary gear train according to claim 2,
wherein said bearing is a sliding bearing, and
wherein said oiling flow path provided inside said carrier is structured to supply said lubricant oil to a surface of said sliding bearing.

7. The planetary gear train according to claim 3,
wherein said bearing is a sliding bearing, and
wherein said oiling flow path provided inside said carrier is structured to supply said lubricant oil to a surface of said sliding bearing.

8. A wind turbine generator, comprising:
a wind turbine rotor including a rotor head and a wind turbine blade coupled with said rotor head;
a gear box including an input shaft coupled to said rotor head; and
a power generator coupled to an output shaft of said gear box,
wherein said gear box includes:
a housing; and
a planetary gear train,
wherein said planetary gear train comprises:
a planetary gear;
a planetary pin for supporting said planetary gear; and
a carrier for supporting said planetary pin, wherein said housing accommodates at least a portion of said carrier, said planetary gear and said planetary pin, wherein said planetary gear is rotatable with respect to said planetary pin by a bearing, wherein an oiling flow path for supplying lubricant oil to said bearing is formed inside said carrier, wherein said carrier is configured to receive said lubricant oil into said oiling flow path from an oiling member stationarily fixed to said housing, wherein said inlet for receiving said lubricant oil into said oiling flow path of said carrier from said oiling member is positioned inside said housing, wherein said carrier includes:
- a carrier main body to which said planetary pin is fixed; and
- an extending member formed as a member distinct from said carrier main body and jointed with said carrier main body, wherein said inlet of the oiling flow path of the carrier is provided for said extending member, wherein a seal structure to be slid against said extending member is attached to said oiling member, wherein said extending member has a sliding surface configured to be slid against said seal structure, wherein said inlet of said oiling flow path of said carrier is provided through said sliding surface, and wherein said sliding surface is surface-processed to be smooth.

9. The wind turbine generator according to claim 8, wherein said bearing is a sliding bearing, and wherein said oiling flow path provided inside said carrier is structured to supply said lubricant oil to a surface of said sliding bearing.

10. A seal member provided for said seal structure of the planetary gear train according to claim 1.

11. A manufacture method for manufacturing a carrier of a planetary gear train, said manufacture method comprising steps of:

manufacturing a carrier main body by casting having a first oiling flow path provided inside thereof and to support a planetary pin;

manufacturing an extending member having a second oiling flow path provided inside thereof for receiving lubricant oil from an oiling member provided for a stationary body;

performing surface-processing on a sliding surface of said extending member to be smooth, said sliding surface being to be slid against a seal attached to the oiling member; and coupling said carrier main body with said extending member so that said first oiling flow path and said second oiling flow path are connected.

* * * * *